Patented Oct. 12, 1943

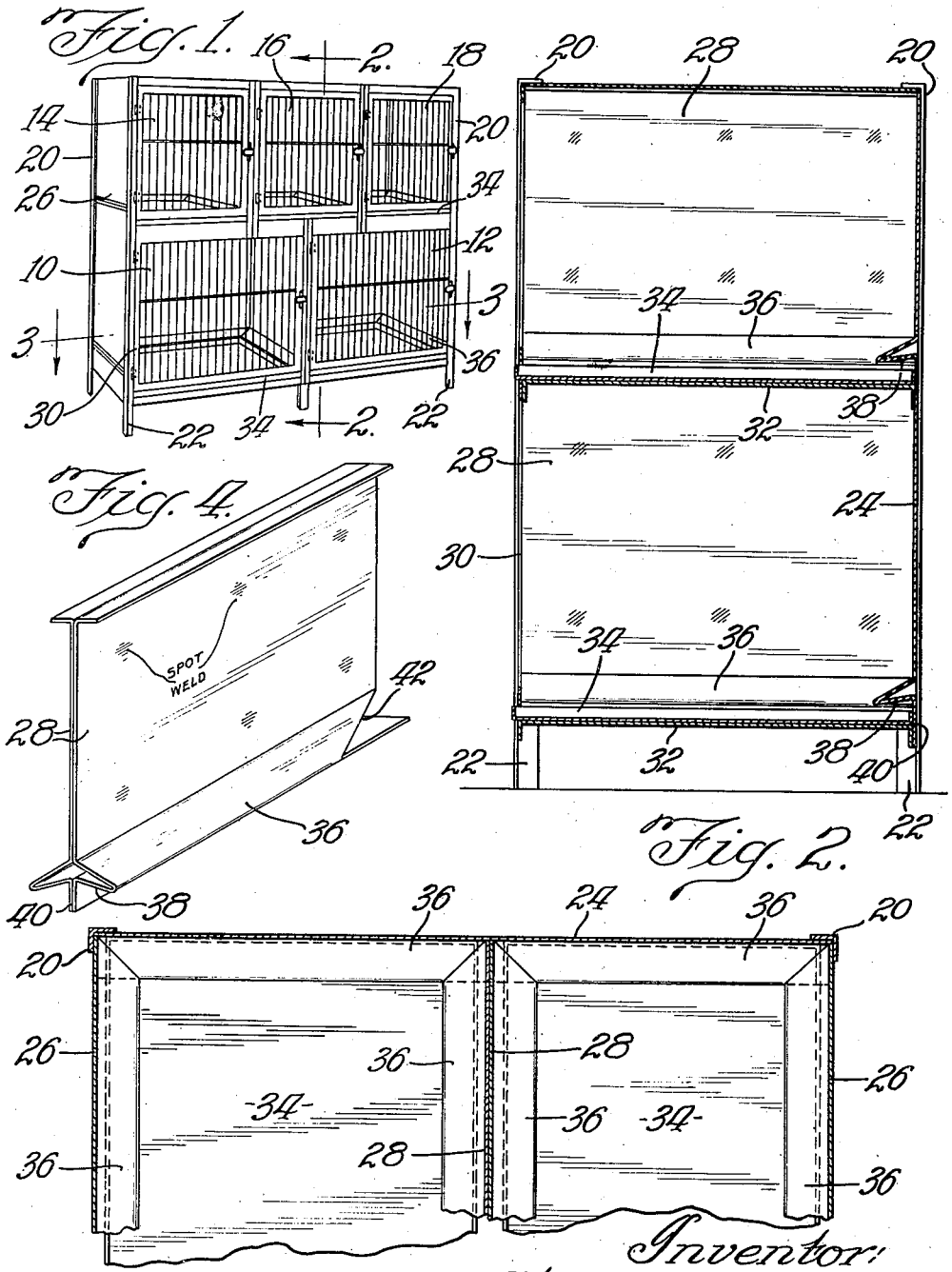

2,331,866

UNITED STATES PATENT OFFICE 2,331,866

CAGE

Glen D. Grogan, Aurora, Ill.

Application January 18, 1940, Serial No. 314,370

3 Claims. (Cl. 119—17)

My invention relates to the care and keeping of animals, birds, and the like. It is particularly applicable to the care of dogs. It includes among its objects and advantages an improvement whereby sanitation is facilitated, and as such is applicable to all kinds of birds and animals, particularly those birds or animals whose habits are such that they occasionally or frequently emit excrement adjacent the walls of the space in which they are at the time confined.

In the accompanying drawing:

Figure 1 is a perspective view on a reduced scale of a set of cages embodying the invention;

Figure 2 is a vertical section as on line 2—2 of Figure 1;

Figure 3 is a partial horizontal section as on line 3—3 of Figure 1; and

Figure 4 is a perspective of one of the inner partitions.

In the embodiment of the invention selected for illustration, I have illustrated an assembled framework defining two lower cages 10 and 12, and three smaller upper cages 14, 16, and 18. The entire assembly is built into a conventional framework 20 made up chiefly of angle iron and provided with short legs 22 for positioning the lower cages slightly spaced from the ground. Each lower cage illustrated comprises a rear wall 24 and side walls 26 and 28, and a hinged door 30. As illustrated, each of the doors 30 is a grillwork, and the walls 24, 26, and 28, or at least substantially the lower third of each of these walls, should be imperforate. The bottom of each cage is also defined by an imperforate floor 32, but this floor does not constitute the proximate support for the occupant of the cage except when the tray 34 is removed temporarily to empty therefrom such straw, litter, food droppings, and excrement as may have accumulated since the last cleaning, after which the tray 34 can be replaced and continue to serve as the proximate support for the occupant for another period. It will be noted that, as indicated in Figure 2, the lower edge of each door 30 is above the level of the tray 34, so that the tray can be removed and replaced without opening the door.

To make sure that no excrement of any sort will work down into any inaccessible place, I provide each of the walls 24, 26, and 28 with an inwardly directed deflector flange or ledge. Each flange is formed as an integral part of the sheet metal side wall from which it projects as by bending the metal outward at 36 in a direction inclined downwardly and inwardly and then back at a sharp angle in a direction inclined outwardly and slightly upwardly as at 38 back to the plane of the side wall, and then again downward as at 40.

At each corner, one of the ledges has its portions 36 and 38 continued without interruption up to or beyond the plane of the intersecting side wall, but the ledge in the other side wall is cut away diagonally to form a notch clearly indicated at 42 in Figure 4, which notch receives and fits closely the portions 36 and 38 of the other ledge. This forms a substantially leak-proof joint at the corners and the tightness of the joint may be enhanced by welding the parts together, although usually the customary coat of paint applied to the side walls is sufficient to seal the joint.

It will be apparent that, particularly because of the slight upward incline of the portions 38, any excrement striking or coming into contact with any of the side walls can not find its way downward past the deflector ledges without falling into the tray where it will be removed. Furthermore, any excrement adhering to the side walls can be readily rinsed and wiped down over the ledges into the tray.

In the particular cage arrangement selected for illustration in Figure 1, I have illustrated a one piece back wall extending along the entire rear side of the entire assembly and constituting the rear walls of all five cages. And I have illustrated the ledges on this back wall formed without notches and the ledges on all the side walls perpendicular to the back wall formed with notches.

Without further elaboration the foregoing will so fully explain my invention that others may, by applying knowledge current at the time of application, readily adapt the same for use under various conditions of service. It will, for instance, be obvious that any of the cages could be provided with more than one door or that the doors illustrated could also be provided with imperforate portions near their lower edges and with ledges identical with the ledges carried by the stationary side walls.

I claim:

1. An enclosure for animals comprising, in combination: a supporting frame structure; a supporting flooring in said structure; a removable tray forming the proximate support for the animal; said tray having a peripheral edge portion above the level of the center; said tray being imperforate; said tray resting on said flooring; side walls; at least one of said side walls being hingedly mounted to swing open and permit ingress or egress of an animal; a plurality of said side walls having inwardly extending ledges overlying the adjacent edges of said tray; the portions of the walls above and adjacent to said ledges being imperforate; each ledge being formed as an integral part of its wall by bending the material forming said wall in and then out again; each ledge having an upper surface sloping downwardly and inwardly, and a lower surface sloping downwardly and inwardly but at a smaller angle to the horizontal; said ledges on adjacent side walls lying at the same level; certain of said ledges being notched by cutting the material away diagonally at the end of the ledge to receive an unnotched ledge extending at a different angle and form a substantially leak-proof corner joint; said hinged side wall having its lower edge above the level of said tray to define a slot through which said tray can be removed and replaced without opening said door.

2. An enclosure for animals comprising, in combination: a supporting flooring; an imperforate tray forming the proximate support for the animal; said tray having a raised edge adapted to retain liquids; said tray resting on said flooring; side walls; at least one of said side walls being hingedly mounted to swing open and permit ingress or egress of an animal; a plurality of said side walls having inwardly extending ledges overlying the adjacent edges of said tray; the portions of the walls above and adjacent to said ledges being imperforate; each ledge being formed as an integral part of its wall by bending the material forming said wall in and then out again; each ledge having an upper surface sloping downwardly and inwardly, and a lower surface sloping downwardly and inwardly.

3. An enclosure for animals comprising, in combination: vertical side walls of sheet metal; a horizontal tray adapted to receive litter or droppings; certain of said side walls being imperforate and bent inwardly and again outwardly to form a deflecting ledge extending inwardly just above the adjacent edge of said tray; one of said side wall portions being hinged along one vertical edge to open said enclosure for ingress or egress of an animal; said hinged side wall portion terminating above the level of said tray and leaving a slot through which said tray can be withdrawn; and means slidably supporting said tray for insertion and withdrawal and adapted to support an animal in said enclosure when said tray is withdrawn.

GLEN D. GROGAN.